(12) United States Patent
Kakinami

(10) Patent No.: US 7,894,631 B2
(45) Date of Patent: Feb. 22, 2011

(54) OBSTACLE DETECTION APPARATUS

(75) Inventor: Toshiaki Kakinami, Nagoya (JP)

(73) Assignee: Aisin Seiki Kabushiki Kaisha, Aichi (JP)

(*) Notice: Subject to any disclaimer, the term of this patent is extended or adjusted under 35 U.S.C. 154(b) by 671 days.

(21) Appl. No.: 11/993,104

(22) PCT Filed: May 30, 2006

(86) PCT No.: PCT/JP2006/310784
§ 371 (c)(1),
(2), (4) Date: Dec. 19, 2007

(87) PCT Pub. No.: WO2007/000868
PCT Pub. Date: Jan. 4, 2007

(65) Prior Publication Data
US 2010/0045448 A1 Feb. 25, 2010

(30) Foreign Application Priority Data
Jun. 27, 2005 (JP) ............................. 2005-186843

(51) Int. Cl.
*G06K 9/00* (2006.01)

(52) U.S. Cl. ...................... 382/103; 382/106; 382/154; 340/435; 340/988; 340/439; 701/36; 701/41; 701/70; 701/72; 701/80; 303/148; 303/149

(58) Field of Classification Search ................. 382/103, 382/154, 106, 100; 701/36, 41; 340/988, 340/932.2, 439; 348/148
See application file for complete search history.

(56) References Cited

U.S. PATENT DOCUMENTS 6,828,903 B2 * 12/2004 Watanabe et al. ........... 340/435

(Continued)

FOREIGN PATENT DOCUMENTS

JP 5-114099 A 5/1993

(Continued)

OTHER PUBLICATIONS

Shuji Yamamoto, Jidoshayo Sanjigen Gazo Shori Gijutsu no Kaihatsu, Society of Automotive Engineers of Japan Gakujutsu Koenkai Zensurishu, Society of Automotive Engineers of Japan, Sep. 17, 2003, No. 78-03, pp. 5 to 8.

Jun Sato, Computer Vision-Geometry of Vision, Corona Publishing Co., Ltd., May 7, 1999, first edition, pp. 80-103.

*Primary Examiner*—Wesley Tucker
*Assistant Examiner*—Nancy Bitar
(74) *Attorney, Agent, or Firm*—Sughrue Mion, PLLC

(57) ABSTRACT

There is provided an obstacle detection apparatus for detecting an obstacle based on an image of periphery of a vehicle and a distance to an obstacle present in the vehicle's periphery.

The apparatus includes distance determining means 3 for determining, in association with traveling of the vehicle along a direction, a distance to the obstacle present in a direction perpendicular to the vehicle traveling direction, image inputting means 2 for obtaining a peripheral image having a view angle including the obstacle, subject-vehicle position specifying means 4 for sequentially specifying a present position of the vehicle which changes in association the traveling of the vehicle, first-plane setting means 5 for setting, as a first plane, a face of the obstacle which extends perpendicular to the horizontal plane and extends, at the same time, along the traveling direction of the vehicle, plane-edge estimating means 6 for estimating an edge of the first plane relative to the vehicle moving direction, based on the distance and the position of the vehicle, image recognition area setting means 7 for setting, as an image recognition area, an area included in the peripheral image and including the plane edge, image recognizing means 8 for image-recognizing a shape characteristics of the obstacle in the image recognition area from the peripheral image, and three-dimensional shape recognizing means 9 for recognizing the obstacle three-dimensionally, based on the first plane and result of the image recognition made by the image recognizing means 8.

7 Claims, 13 Drawing Sheets

U.S. PATENT DOCUMENTS

| | | | |
|---|---|---|---|
| 6,958,770 B2 * | 10/2005 | Okada et al. | 348/149 |
| 7,230,524 B2 * | 6/2007 | Watanabe et al. | 340/435 |
| 7,499,638 B2 * | 3/2009 | Arai et al. | 396/108 |
| 7,519,459 B2 * | 4/2009 | Ito et al. | 701/36 |
| 7,739,046 B2 * | 6/2010 | Satonaka et al. | 701/300 |

FOREIGN PATENT DOCUMENTS

| | | | |
|---|---|---|---|
| JP | 2002-123818 A | | 4/2002 |
| JP | 2002-170103 A | | 6/2002 |
| JP | 2003-132349 A | | 5/2003 |
| JP | 2004-142557 A | | 5/2004 |
| JP | 2004-213489 | * | 7/2004 |

* cited by examiner

OBSTACLE DETECTION APPARATUS

TECHNICAL FIELD

The present invention relates to an obstacle detection apparatus for detecting an obstacle, based on an image of periphery of a vehicle and a distance to an obstacle present in the vehicle's periphery.

BACKGROUND ART

For the purpose of detection of an obstacle present in periphery of a vehicle, both image information and distance information are important. Image information can provide distinct information for obstacle detection through driver's visual perception. Distance information is useful in determination of whether an object is located at a position where it can be potentially be an obstacle for the vehicle. The image of the vehicle's periphery is obtained by a camera mounted on the vehicle. The peripheral image thus obtained will be displayed, as it substantially is, on a display unit mounted inside the vehicle or put for use in various image recognition schemes. The distance to the obstacle present in the vehicle's periphery can be alternatively obtained by calculation using an image processing technique. In such case, both image information and distance information can be obtained from image captured by the camera.

Patent Document 1 identified below discloses a technique for obtaining a perpendicular distance to an obstacle (object), with using two screens of differing view points. In this technique, a first screen and a second screen which have different view points from each other are generated by two cameras which are disposed in parallel on the right and left sides with a predetermined space therebetween. Then, the technique calculates an amount of displacement between corresponding object image portions of the respective image screens. Subsequently, by applying the triangulation principle to this displacement amount, the technique eventually obtains a perpendicular distance from a straight line joining the right and left cameras to the object.

According to the above-described object recognition technique, the technique requires precision alignment of the right and left cameras in order to obtain a stereoscopic view, since any misalignment between the right and left cameras will lead directly to an error in the position coordinates calculation of the object. Thus, if an apparatus implementing this object recognition technique is to be mounted on a motorcar or the like, there is not much freedom in the layout of the cameras on the motorcar. Therefore, there will be imposed high precision requirement on the mounting of the cameras.

In view of the above-described state of the art and others, for the purpose of determination of a distance to an obstacle located in periphery of a vehicle, there has often been employed a distance sensor exemplified by a sonar using supersonic wave. Patent Document 2 identified below shows a technique according to which cameras and a sonar are mounted and a display unit displays images obtained thereby with appropriate switchover in displaying condition of the images. More particularly, according to this technique, immediately after start-up of the vehicle, the display unit displays both an image of forward lateral side of the vehicle and an image of an area immediately ahead of and below the vehicle, in equal manner. Thereafter, if the sonar detects presence of an approaching obstacle ahead of the vehicle, the display unit will now display the image immediately ahead of and blow the vehicle with appropriate highlight, relative to the forward lateral side image. On the other hand, if the sensor detects no such obstacle, the display unit will display, this time, the forward lateral side image with appropriate highlight, relative to the image immediately ahead of and blow the vehicle.

In the case of this technique, the distance information obtained by the sonar is used in determination of whether the obstacle is located at a position wherein it can really be an obstacle for the vehicle. Whereas, the presence of the obstacle can be alarmed effectively as the image information to the driver. In this technique, however, the distance information comprises low resolution information indicative of only whether the obstacle is present at a position within a detection range of the sonar or not. As such, the shape characteristics of the obstacle remains unknown or it can be known, only with significant workload on the calculation by the image processing.

On the other hand, Patent Document 3 identified below discloses a technique relating to an apparatus for making a map of parking space in which a distance determining means such as a supersonic sensor and an image pickup means such an electronic camera respectively recognize a space available for vehicle parking. According to this technique, from an image obtained by the image pickup means, there is extracted a characteristic portion representing the depth of the image. Then, a distance to the extracted characteristic portion is calculated, based on a position on the obtained image and determination result of the distance determining means, whereby a space available for parking the vehicle is recognized as a rectangular space (see FIG. 5 of Patent Document 3), which then is made into and displayed as a parking space map.

Patent Document 1: Japanese Patent Application "Kokai" No. 5-114099 (paragraphs 16-20, FIGS. 3-5).

Patent Document 2: Japanese Patent Application "Kokai" No. 2004-142557 (paragraphs 5-7, FIGS. 1-3).

Patent Document 3: Japanese Patent Application "Kokai" No. 2002-170103 (paragraphs 3-12, paragraph 29, FIGS. 1-3 and FIG. 5).

DISCLOSURE OF THE INVENTION

Object to be Achieved by Invention

As described above, the technique disclosed in Patent Document 3 utilizes determination result obtained by the distance determining means in combination with the image processing. Therefore, compared with the technique which calculates a distance with use of image processing, the above technique allows reduction in time required for distance determination, so that a reliable parking space map can be created speedily while the vehicle is traveling. However, as the parking space is displayed as a rectangular space, it cannot be said that the detection made by this technique is of high precision taking the shape characteristics of the obstacle into consideration also.

The present invention has been made in view of the above-described state of the art. The primary object of the present invention is to provide an improved obstacle detection apparatus which allows detection of an obstacle with higher precision and reliability, yet with reduced calculation amount, based on an image of periphery of the vehicle and a distance to an obstacle present in the vehicle's periphery.

Means to Achieve Object

For achieving the above-noted object, according to the present invention, there is provided an obstacle detection apparatus for detecting an obstacle based on an image of periphery of a vehicle ("subject vehicle") and a distance to an obstacle present in the vehicle's periphery, the apparatus being characterized by:

distance determining means for determining, in association with traveling of the vehicle along a direction, a distance to the obstacle present in a direction perpendicular to the vehicle traveling direction;

image inputting means for obtaining a peripheral image having a view angle including the obstacle, in association with the traveling of the vehicle;

subject-vehicle position specifying means for sequentially specifying a present position of the vehicle which changes in association the traveling of the vehicle;

first-plane setting means for setting, as a first plane and based on said distance and said subject-vehicle position, a face of the obstacle which extends perpendicular to the horizontal plane and extends, at the same time, along the traveling direction of the vehicle;

plane-edge estimating means for estimating a plane edge of said first plane relative to the vehicle moving direction, based on said distance and said position of the vehicle;

image recognition area setting means for setting, as an image recognition area, an area included in the peripheral image and including said plane edge;

image recognizing means for image-recognizing a shape characteristics of the obstacle in the image recognition area from the peripheral image; and three-dimensional shape recognizing means for recognizing the obstacle three-dimensionally, based on said first plane and result of the image recognition made by said image recognizing means.

According to this characterizing feature, there can be provided an obstacle detection apparatus which allows detection of an obstacle with higher precision and reliability, yet with reduced calculation amount, based on an image of periphery of the vehicle and a distance to an obstacle present in the vehicle's periphery. More particularly, information obtained by the distance determining means is used, in combination with a subject-vehicle position specified by the subject-vehicle position specifying means, for setting a first plane. And, this information is used also for the setting of the image recognition area within the peripheral image on which area detailed image recognition is to be effected. The image recognizing means effects an image recognition of a shape characteristics of the obstacle in the image recognition area. More particularly, the image recognizing means effects image recognition of the shape characteristics of the obstacle within the image recognition area, rather than effecting image recognition on the entire peripheral image. Therefore, with this characterizing feature, the image recognizing means can reduce the amount of calculation needed for the image recognition. And, the three-dimensional shape recognizing means recognizes the obstacle three-dimensionally, based on the first plane and result of the image recognition made by the image recognizing means. At a portion where the obstacle is present in a stable manner, mainly the presence of the obstacle can be made, based on the first plane obtained with using the distance information determined by the distance determining means. And, at the edge of the obstacle (the plane edge of the first plane), the shape characteristics of the obstacle can be detected in high precision, by means of the image recognition technique. As a result, there has been obtained an obstacle detection apparatus capable of detecting an obstacle three-dimensionally with high precision and high reliability, yet with reduced amount of calculation.

Preferably, said image recognizing means recognizes a curve shape of the obstacle, by effecting the image recognition of the shape characteristics of the obstacle in the image recognition area, and said three-dimensional shape recognizing means recognizes the obstacle three-dimensionally, based on said first plane and said curve shape.

With the above-described construction, the curve shape of the obstacle is recognized within the set image recognition area. Then, the object is recognized with precision, based on the first plane and the curve shape. Therefore, the result of this image recognition can be utilized as information of high reliability when used in other associated devices, such as a driving assist device, a parking assist device, etc. At a portion where the obstacle is present in a stable manner, the presence of the obstacle can be made, based on the first plane. Whereas, at the edge of the obstacle, the curve shape of the obstacle can be detected with high precision. Recognition of a curve shape usually requires high calculation workload. With the above-described inventive construction, however, this curve shape recognition is effected only within the necessary image recognition area, rather than effecting detailed image recognition processing on the entire peripheral image. Hence, the construction requires only a smaller amount of calculation. As a result, it is possible to provide an obstacle detection apparatus capable of detecting an obstacle three-dimensionally, with reduced amount of calculation, yet with high precision and high reliability.

Alternatively, the distance determining means is mounted to a lateral face of the vehicle to be oriented laterally; the image inputting means is mounted to be oriented toward at least one of the front side and the rear side of the vehicle; the image inputting means includes temporary storage means for temporarily storing the peripheral image obtained; and the shape recognizing means effects the image recognition of the shape characteristics from the peripheral image stored in said temporary storage means.

With the obstacle detection apparatus relating to the present invention, the image recognition area on which the image recognizing means effects image recognition is determined, with utilizing the distance information determined by the distance determining means. Then, if the image inputting means includes temporary storage means, even if there occurs a difference between the timing when the determination result is obtained by the distance determining means and the timing when the peripheral image including the image recognition area is obtained, this difference can be effectively compensated for. More particularly, even if the subject vehicle has passed a position including the peripheral image within the view angle before the distance information is obtained, the peripheral image has been stored in the temporary storage means, so that from this peripheral image stored based on the distance information, image recognition of the shape characteristics of the image recognition area can be carried out effectively.

Still preferably, the distance determining means is mounted ahead of the image inputting means in the vehicle moving direction and mounted to a lateral face of the vehicle to be oriented laterally; whereas the image inputting means is mounted to be oriented to the rear side in the vehicle moving direction.

With this construction, the distance determining means is mounted ahead of the image inputting means relative to the moving direction of the vehicle (subject vehicle). Therefore, the image recognition area on which the image recognizing means is to effect its image recognition can be set, by utilizing the distance information determined in advance by the distance determining means. That is, with this construction, there occurs no such situation where the vehicle has passed a position including the peripheral image within the view angle before the distance information can be obtained. Therefore, the image recognition of the shape characteristics can be carried out effectively, without needing to provide such storage means as the temporary storage means described above. And, the apparatus construction can be simplified, with omission of the storage means.

According to one preferred embodiment of the present invention, a pair of distance determining means oriented laterally are provided on opposed lateral sides at a front portion of the vehicle; and at a rear portion of the vehicle, there is provided image inputting means having a rearward field of view and having a wide angle. In case an obstacle is to be recognized in the course of forward traveling of the vehicle, the obstacle can be detected effectively, without needing to provide the temporary storage means. In case the distance determining means and the image inputting means have the same constructions as above and it is desired to detect an obstacle in the course of a rearward movement of the vehicle also, then, the temporary storage means may be provided. With provision of the temporary storage means, it becomes possible to cause the distance determining means and the image inputting means to be less dependent on their setting locations and the traveling direction of the vehicle.

Further, the obstacle detection apparatus relating to the present invention is characterized in that said image recognizing means detects another vehicle parked in the periphery of the subject vehicle, as said obstacle.

With the above characterizing feature, the vehicle (subject vehicle) mounting the inventive obstacle detection apparatus can effectively detect another parked vehicle which can be an "obstacle" when the subject vehicle is to move past or park nearby the parked vehicle.

Still further, the obstacle detection apparatus relating to the present invention is characterized in that the image recognizing means recognizes a curve shape of the parked vehicle based on an occlusion contour thereof.

With the above characterizing feature, it becomes possible to detect with high precision the curve shape of the parked vehicle as a potential obstacle. Therefore, effective detection result can be obtained when the vehicle (subject vehicle) mounting the inventive obstacle detection apparatus is to move past or park nearby the parked another vehicle.

Still further, the obstacle detection apparatus relating to the present invention is characterized in that the image recognizing means recognizes a corner portion of the parked vehicle.

With the above characterizing feature, it becomes possible to detect with high precision also a corner portion of the parked vehicle as a potential obstacle. Therefore, high-precision detection result can be obtained when the vehicle (subject vehicle) mounting the inventive obstacle detection apparatus is to move past or park nearby the parked another vehicle.

BEST MODE OF EMBODYING INVENTION

Next, with reference to accompanying drawings, preferred embodiments of an obstacle detection apparatus relating to the present invention will be described.

[System Construction]

FIG. 1 is a block diagram schematically showing a construction of an obstacle detection apparatus to which the present invention relates. As shown, the inventive obstacle detection apparatus is provided for detecting an obstacle present in the periphery of a vehicle, based on an image of the vehicle's periphery and a distance to an object which can potentially be an "obstacle" for the vehicle as it is located in the periphery. As shown in FIG. 1, the apparatus includes a camera 2A as an image inputting means 2, a distance sensor 3 as a distance determining means, a subject-vehicle position specifying means 4, a first plane setting means 5, a plane-edge estimating means 6, an image recognition area setting means 7, an image recognizing means 8 and a three-dimensional shape recognizing means 9.

An ECU (Electronic Control Unit) 1, as a core component of the inventive obstacle detection apparatus, incorporates the various means cited above, as shown in FIG. 1. Preferably, this ECU 1 is comprised of a group of logic circuits such as a microcomputer, a DSP (Digital Signal Processor), etc. As well-known in the art, such component as the microcomputer is programmable to carry out a variety of calculations. For this reason, the above-described functional means are not limited to those which can be clearly distinct in terms of hardware. Rather, it will suffice for these to provide their respective functions.

The camera 2A as image inputting means 2 is provided, in this particular embodiment, as a so-called rear-view camera mounted at a rear portion of the vehicle for obtaining an image of the rear side with a wide angle of view. The camera 2A is configured to obtain an image of the periphery of the vehicle including at least an obstacle if any therein.

The distance sensor 3 as a distance determining means, is constructed as a point sensor mounted to be oriented laterally of the vehicle. Examples thereof include a single beam sensor using laser and a sonar using supersonic wave. The distance sensor 3, as will be detailed later, is configured to determine a distance to an obstacle present in a direction perpendicular to a moving direction of the vehicle, in association with this vehicle movement. The determined distance is used as distance information in a variety of processing to be described later.

As shown in FIG. 1, the subject-vehicle position specifying means 4 includes a moving condition detecting means 4A and a subject-vehicle position calculating means 4B. The moving condition detecting means 4A is comprised of wheel speed sensors 41 attached to four wheels (FR, FL, RR, RL) mounted at front and rear right and left portions of the vehicle and a steering sensor 42. Each wheel speed sensor 41 detects a rotational speed and a rotational angle of the wheel associated therewith. The steering sensor 42 detects a steering angle of the vehicle, based on an rotational angle of a steering unit.

Incidentally, the steering angle can alternatively be calculated from a difference between the rotational speeds determined by the wheel speed sensors 41 for the respective wheels associated therewith. With the subject-vehicle position specifying means 4 in operation, a moving condition of the vehicle is detected by the moving condition detecting means 4A and the position of the subject vehicle variable in association with moving the vehicle is specified by the subject-vehicle position calculating means 4B in a reference coordinates system. This reference coordinates system is called also "world coordinates system", which is a coordinate system set in common for the camera, the object, etc. in an image processing system. As a further embodiment of the invention, the subject-vehicle position can be specified, by a method which determines sequentially how much the vehicle (subject vehicle) has moved in what direction per each unit time.

Based on the distance information and the subject-vehicle position, the first plane setting means 5 sets a plane, a face of the obstacle extending along the moving direction of the vehicle (subject vehicle), as a first plane which is a plane perpendicular to the horizontal plane in the reference coordinates system. The plane-edge estimating means 6 estimates a plane edge of the first plane in the direction parallel to the horizontal plane. The image recognition area setting means 7 sets an image area in the peripheral image including the above-described plane edge as an image recognition area. The image recognizing means 8 recognizes the shape characteristics of an object as an obstacle, from the peripheral image captured by the camera 2A. The three-dimensional shape recognizing means 9 recognizes the object three-dimensionally, based on the first plane and the recognition result by the image recognizing means 8. The details of these functional means will be described later herein.

[Principle]

The obstacle detection apparatus according to the present invention is provided for recognizing an obstacle three-dimensionally in an effective, yet with reduced calculation load, through utilization of both advantages of distance information obtained from the distance sensor 3 mounted on the vehicle and image information obtained from the camera 2A.

Generally speaking, the distance sensor 3 such as a sonar is superior in terms of detection precision for a distance to an object located in direct opposition thereto. However, as the diameter of beam emitted from the distance sensor 3 progressively widens with increase in its traveling distance, the distance sensor 3 is not suited for precision detection of an edge of the object.

On the other hand, an image captured by the camera 2A is two-dimensional. Hence, the camera 2A is not suited for detection of a distance to an object. In this regard, it is conceivable to use a plurality of cameras for obtaining a stereoscopic image, from which a distance is to be calculated by an image processing technique. However, such construction poses significant calculation workload, thus being not comparable to the distance sensor 3. However, for a portion having a high image contrast, such as an edge of an object, the two-dimensional image can be effectively utilized to realize precision detection of the shape characteristics or contour thereof. In this respect, the image processing technique is superior.

As described above, the distance sensor 3 and the camera 2A have complimentary relationship with each other. Then, the present invention takes advantage of both of them.

Next, the basic principle underlying the present invention will be described by way of an example in which a vehicle (to be referred to as "subject vehicle" hereinafter for the sake of convenience of explanation) detects three-dimensionally another vehicle (to be referred to as a "parked vehicle" hereinafter for the sake of convenience of explanation) as an "obstacle".

FIG. 2 shows an explanatory diagram illustrating a case for obtaining, in association with a movement of a vehicle 20, a distance to a parked vehicle 30 as an "obstacle" and a peripheral image of the vehicle 20 including an image of the parked vehicle 30. At opposed front lateral portions of the vehicle 20, there are mounted distance sensors 3 oriented laterally, as distance determining means. In FIG. 2, there is shown only one distance sensor 3 on the side where the parked vehicle 30 is present. At a rear portion of the vehicle 20, there is provided a camera 2A oriented rearward, as an image inputting means 2 for capturing an image of the rear side with a wide angle. The distance sensor 3 determines a distance to the parked vehicle 30, in association with movement of the vehicle 20 along a moving direction indicated by an arrow M. More particularly, in association with a movement from a condition (position 2a) shown in FIG. 2 (a) to a condition (position 2d) shown in FIG. 2 (d), the distance sensor 3 detects distance information S to a plane of the parked vehicle 30 along the moving direction of the vehicle 20 (see FIG. 3).

Under the condition (position 2a) shown in FIG. 2 (a), the distance sensor 3 "roughly" detects a corner portion C2 at the rear edge of the parked vehicle 30 shown in FIG. 3. As the vehicle 20 travels forward along the moving direction M and reaches a condition (position 2c) shown in FIG. 2 (c), the corner portion C2 of the rear edge of the parked vehicle 30 is detected with high precision this time by the camera 2A. Also, under the condition (position 2b) shown in FIG. 2 (b), the distance sensor 3 roughly detects a corner portion C1 at the front edge of the parked vehicle 30 shown in FIG. 3. As the vehicle 20 travels forward along the moving direction M and reaches the condition (position 2d) shown in FIG. 2 (d), the corner portion C1 of the front edge of the parked vehicle 30 is detected with high precision this time by the camera 2A.

The distance information S is obtained with movement of the vehicle 20 as illustrated in FIG. 3. The position of the moving vehicle 20 is specified by the subject-vehicle position specifying means 4 on a reference coordinate system. Then, based on the distance information S (detected distance) and the subject-vehicle position, the first plane setting means 5 sets a plane of the parked vehicle 30 along the moving direction of the vehicle 20 as a first plane LN (longitudinal plane). This first plane LN is a plane which extends perpendicular to the horizontal plane on the reference coordinates system. The opposed edges of the first plane LN along the moving direction will be referred to as plane edges (corner portions C). Further, at the plane edge on the front end of the parked vehicle 30, there is formed a second plane LT0 (lateral plane) which extends perpendicular to the horizontal plane and the first plane. This second plane LT0 is a temporary set lateral plane. A more precise second plane LT will be constructed through subsequent image recognition processing by the image recognizing means 8 as will be described later.

As described hereinbefore with reference FIG. 2, subsequent to the detection of the parked vehicle 30 by the distance sensors 3, the camera 2A will capture the image of the parked vehicle within its view angle. The corner portions C of the parked vehicle 30 shown in FIG. 5 are captured by the camera 2A, with a lapse after the detection of the parked vehicle 30 by the distance sensors 3. In the peripheral image captured by the camera 2A, the corner portion C will be set as an image recognition area. And, the shape characteristics of the parked vehicle 30 in this image recognition area is image-recognized from the peripheral image by the image recognizing means 8. That is, with using the peripheral image obtained by the camera 2A, the corner portion C of the parked vehicle 30 is detected with high precision.

This high-precision detection means e.g. image recognition of the curve shape SS (surface shape) at the rear edge corner portion C2 of the parked vehicle 30 as shown in FIG. 6 and reconstruction of the second plane LT at the front edge corner portion C1 of the parked vehicle 30. Needless to say, the image recognition and the reconstruction of the curve shape SS and the second plane LT can be done at the opposite corner portions C to those shown in FIG. 6. Further alternatively, the recognition of the curve shape SS and the reconstruction of the second plane LT can be done at both corner portions C.

Though will be detailed later, for the front edge corner portion C1 of the parked vehicle 30, an image recognition processing is effected based on a front profile as the shape characteristic, so as to reconstruct the second plane LT. This is a more precisely constructed plane adjoining the front edge of the parked vehicle 30 than the "temporary" second plane LT0 described above.

Though also will be detailed later, for the rear edge corner portion C2 of the parked vehicle 30, an image recognition processing is effected based on an occlusion profile as the shape characteristic, so as to recognize the curve shape SS. Then, based on the first plane LN, the second plane LT and the curve shape SS, the three-dimensional recognizing means 9 recognizes the parked vehicle 30 three-dimensionally.

[Other Modes of Obtaining Distance Information and Image Information]

The mode of obtaining the peripheral image and the distance information by the image inputting means 2 and the distance determining means 3 is not limited to that illustrated in FIG. 2. FIG. 7 is an explanatory view illustrating a further mode thereof. At the front portions of the opposed lateral sides of the vehicle 20, there are mounted the distance sensors 3 oriented laterally as the distance determining means. At a front portion of the vehicle 20, there is mounted the camera 2A oriented forwardly as the image inputting means 2. The distance sensor 3 determines a distance to the parked vehicle 30, in association with movement of the vehicle 20 along the moving direction denoted with the arrow M. That is, in association with movement from a condition (position 7a) shown in FIG. 7 (a) to a condition (position 7c) shown in FIG. 7 (c), the sensor detects distance information S to a plane of the parked vehicle 30 along the moving direction of the vehicle 20. In FIG. 7, the camera 2A is mounted on the side of the moving direction of the vehicle 20. Therefore, unlike the mode illustrated in FIG. 2, the camera 2A obtains the peripheral image, prior to the detection by the distance sensor 3.

FIG. 8 is an explanatory view illustrating a still further mode. At the front portions of the opposed lateral sides of the vehicle 20, there are mounted the distance sensors 3 oriented laterally as the distance determining means. At the front and rear portions of the vehicle 20, there are mounted the cameras 2A oriented forwardly and rearwardly respectively as the image inputting means 2. The distance sensor 3 determines a distance to the parked vehicle 30, in association with movement of the vehicle 20 along the moving direction denoted with the arrow M. That is, in association with movement from a condition (position 8a) shown in FIG. 8 (a) to a condition (position 8d) shown in FIG. 8 (d), the sensor detects distance information S to a plane of the parked vehicle 30 along the moving direction of the vehicle 20. In FIG. 8, the cameras 2A are provided at the two portions, on the moving direction side of the vehicle 20 and on the opposite side thereto. Therefore, prior to the detection by the distance sensor 3, a peripheral image is obtained by the camera 2A provided on the moving direction side; and also subsequent to the detection by the distance sensor 3, a peripheral image is obtained by the camera 2A provided on the opposite side thereto.

In the modes illustrated in FIGS. 7 and 8, unlike the mode illustrated in FIG. 2, in some cases, the peripheral image is obtained by the camera 2A, prior to the detection by the distance sensor 3. As described above, the basic operational principle of the present invention is that the distance sensors 3 effect "rough" or "approximate" detection and then based on the corner portion C (plane edge) roughly detected, an image recognition processing is effected with using the peripheral image obtained by the camera 2A. Thus, as shown in FIG. 9, the image inputting means 2 is provided with a temporary storage means 2B for temporarily storing the image captured by the camera 2A. Then, even when the peripheral image has been obtained prior to the detection of the corner portion C by the distance sensor 3, the peripheral image may be obtained from the temporary storage means 2B after the detection, so that the image recognition of the corner portion C may be done effectively.

Incidentally, though not shown, on the lateral face of the vehicle 20, there may be provided an additional camera 2A oriented toward the similar direction to the distance sensor 3 and having an angle of view inclusive of the position of the obstacle detected by the distance sensor 3.

Embodiment

Next, as shown in FIG. 10, the present invention will be described in details with taking an example of a construction in which the vehicle 20 travels past by two parked vehicles 30 (30A, 30B) as "obstacles", and detection is made for the two parked vehicles 30 and a space therebetween. Incidentally, the result of the detection of this construction can be utilized for assisting when the vehicle 20 makes parallel parking.

Information useful in assisting such parallel parking, as shown in FIG. 11, includes a first plane LN (longitudinal plane) indicative of the lateral faces of the parked vehicles 30A and 30B, a curve shape (surface shape) SS of a corner portion CB of the parked vehicle 30B close to the vehicle 20, a second plane LT (lateral plane) indicative of the position of the front edge of the other parked vehicle 30A far from the vehicle 20, a size of parking space PS, a longitudinal distance (overtaking distance) OD from the vehicle 20 to the parking space PS and a lateral distance (side distance) SD from the vehicle 20 to the first plane LN.

Of the above, the parking space PS can be readily obtained from the second plane LT and the curve shape SS (second plane LT1). The longitudinal distance OD and the lateral distance SD can be readily obtained from the first plane LN and the curve shape SS (second plane LT1). Therefore, the important task for the obstacle detection apparatus of the invention resides in detection of the first plane LN, the curve shape SS and the second plane LT. For instance, if the first plane LN, the curve shape SS and the second plane LT can be obtained as illustrated in FIG. 12, then, by displaying these in superimposition with the image obtained by the camera 2A, effective driving assistance is made possible.

The first plane LN, as described hereinbefore with reference to FIGS. 3 and 4, can be obtained based on the distance information S obtained by the distance sensor 3. Therefore, the rest of the important task comprises the image recognition of the curve shape SS and the reconstruction of the second image LT by image recognition. As shown in FIG. 11, in order to reconstruct the second plane LT, it is necessary to image-recognize the front profile FP as the shape characteristics at the corner portion CA of the parked vehicle 30A. In order to recognize the curve shape SS, it is necessary to image-recognize an occlusion profile OP at the corner portion CB of the parked vehicle 30B. Next, the image recognitions of the front profile and the occlusion profile will be described.

[Front Profile]

FIG. 13 is an explanatory view illustrating a method of calculating the front profile. As shown hereinbefore in FIG. 10, the vehicle 20 travels along the moving direction M past by the parked vehicle 30A. At the rear portion of the vehicle 20, there is mounted the camera 2A oriented rearward. The corner portion CA of the parked vehicle 30A will be included in the view angle of the camera 2A when the vehicle 20 has passed a border point BP and then will move away with further traveling of the vehicle 20. The distance sensor 3 detects the approximate position of the corner portion CA. Therefore, with using a peripheral image past the border point BP, the front profile can be calculated (image-recognized).

FIG. 14 is an explanatory view for illustrating the epipolar geometry principle which is one typical method for calculating front profile. In the figure, two rectangular solids represent an identical object imaged at two view points of a camera which effects translation. Here, "translation" means a movement of the camera free from any rotational component, so that the properties of the camera remain the same before and after the movement. In the figure, marks (m), (m') represent image points representing an identical point of the solid in the two different images. In FIG. 14, there are shown three points: m'1 through m'3 corresponding respectively to three points: m1 through m3. Lines 11-13 joining each (m) with each (m') corresponding thereto are referred to "epipolar lines" 1. The three epipolar lines intersect at one point, which is defined as the "epipole" (e). This characteristics is called "auto epipolar". Then, by utilizing this characteristics and calculating three-dimensional coordinates from the corresponding points (m, m') obtained from the epipolar geometry, three-dimensional information of an object can be obtained.

The detailed explanation of the above technique is found in e.g. "Computer Vision-Geometry of Vision-) ISBN: 4-399-02363-9 ", Jun Sato, Corona Publishing Co., Ltd. 1999, May 7, first edition: p. 80-103. Therefore, the explanation thereof is omitted herein.

FIG. 15 shows an example wherein the epipolar geometry is applied to the parked vehicle 30A. A moving distance, if short, can be taken approximately as a translating movement, even if the movement of the camera 2A includes a rotational component due to e.g. a steering of the vehicle 20. Then, in the peripheral image captured by the camera 2A, epipolar lines (1) are applied to scanning lines (sl). Then, by scan-line matching of corresponding positions on the scanning lines (sl), three-dimensional information is obtained. Here, the three-dimensional information refers to points, breakpoints, rectangles, etc. Then, by combing these information, a second plane LT is reconstructed. Incidentally, use of the epipolar geometry is not absolutely needed. Instead, three-dimensional information can be obtained from perpendicular scanning lines (sl) as illustrated in FIG. 16.

[Occlusion Profile]

FIG. 17 is an explanatory view for explaining curve shape recognition with occlusion contour OC, which is a typical technique for calculating the occlusion profile. As described in "Computer Vision-Geometry of Vision-" supra, it is possible to apply the epipolar geometry to a curve. This, however, requires significant calculation workload. Needless to say, the epipolar geometry can be used e.g. when the calculation capacity of the ECU1 is sufficient therefor. In this embodiment, a different method will be described in order to demonstrate the application of the epipolar geometry is not absolutely needed.

First, a two-dimensional occlusion contour OC is extracted from the peripheral image. More particularly, transitions are detected from the peripheral image and there is extracted an occlusion contour OC of portions corresponding to the transitions between the parked vehicle 30B and the background. As shown in FIG. 18, since the corner portion CB is a curve, the light rays R from the camera 2A are blocked at a plurality of points of the parked vehicle 30B for each image. Namely, the points representing the corner portion CB on the two-dimensional occlusion profile comprise a group of points. The three-dimensional occlusion profile is a curve shape, hence, the points representing the corner portion CB differ from each other. The points representing the three-dimensional corner portion CB correspond to those points located on the outermost side present on the two-dimensional occlusion profile OC within the peripheral image. According to the number of three-dimensional rays R tangent to the corner portion CB of the parked vehicle 30B, there are a plurality of points representing the corner portion CB. The occlusion profile is calculated as an "envelope" of all the rays R, as illustrated in FIG. 19.

As shown in FIG. 20, the corner portion CB as present as a plurality of points are tangent to all of the rays R. Hence, the corner portion can be approximated by an osculating circle EC to all of the rays R. The osculating circle EC is a circle tangent to both the first plane LN and the second plane LT1 perpendicular to the first plane LN. If a curve is drawn to join the osculating circle EC, the first plane LN and the second plane LT via contacts to the first plane LN and the second plane LT, this generates a contour shape CS, which, when interpreted three-dimensionally, provides a curve shape SS.

For the calculations of the front profile and the occlusion profile, extraction of the transitions on the scanning lines (sl) is needed. If this is to be made for the entire peripheral image, the amount of calculation needed therefor will be enormous. However, the use of the distance sensor 3 can advantageously restrict the image area where the front profile or occlusion profile is to appear, so that the three-dimensional information can be readily obtained in this restricted image area. If the distance sensor 3 is passing in opposition to obstacles (parked vehicles 30) as shown in FIG. 21, the distance information S will have smooth transition (sections denoted with the mark P). Also, if the distance sensor 3 is located at a position far from the obstacle and no obstacle is present there, then, the distance information S from this distance sensor 3 will overflow (the section denoted with the mark B). Therefore, in either case, in each section, the distance information S is smooth. However, the section I between these two sections shows a sharp change. This section I corresponds substantially to the front or rear corner portion C of the parked vehicle 30. The position of the corner portion C of the parked vehicle 30 in the peripheral image is set by the image recognition area setting means 7. That is, this can be set as a region of interest ROI for which the shape characteristics such as the occlusion profile or the front profile is to be recognized. According to the present invention, since the image processing is done using only the peripheral image corresponding to the region of interest, the calculation workload can be alleviated.

In the above, the embodiment of the present invention has been described with using parallel parking as an example. Needless to say, the invention can apply also to a garage parking (angle parking). Further, the obstacle is not limited to a parked vehicle, but can be a variety of objects such as a wall face facing a narrow road, an electric pole near a wall face facing a narrow road, etc.

As described above, it has become possible to provide an obstacle detection apparatus capable of detecting an obstacle with high precision and high reliability, yet with less amount of calculation, based on an image of periphery of the vehicle and a distance to the object present in the vehicle's periphery.

INDUSTRIAL APPLICABILITY

The obstacle detection apparatus of the invention can be used in a parking assisting device for a vehicle, a traveling assist device, etc.

DESCRIPTION OF REFERENCE MARKS

Figure 1:
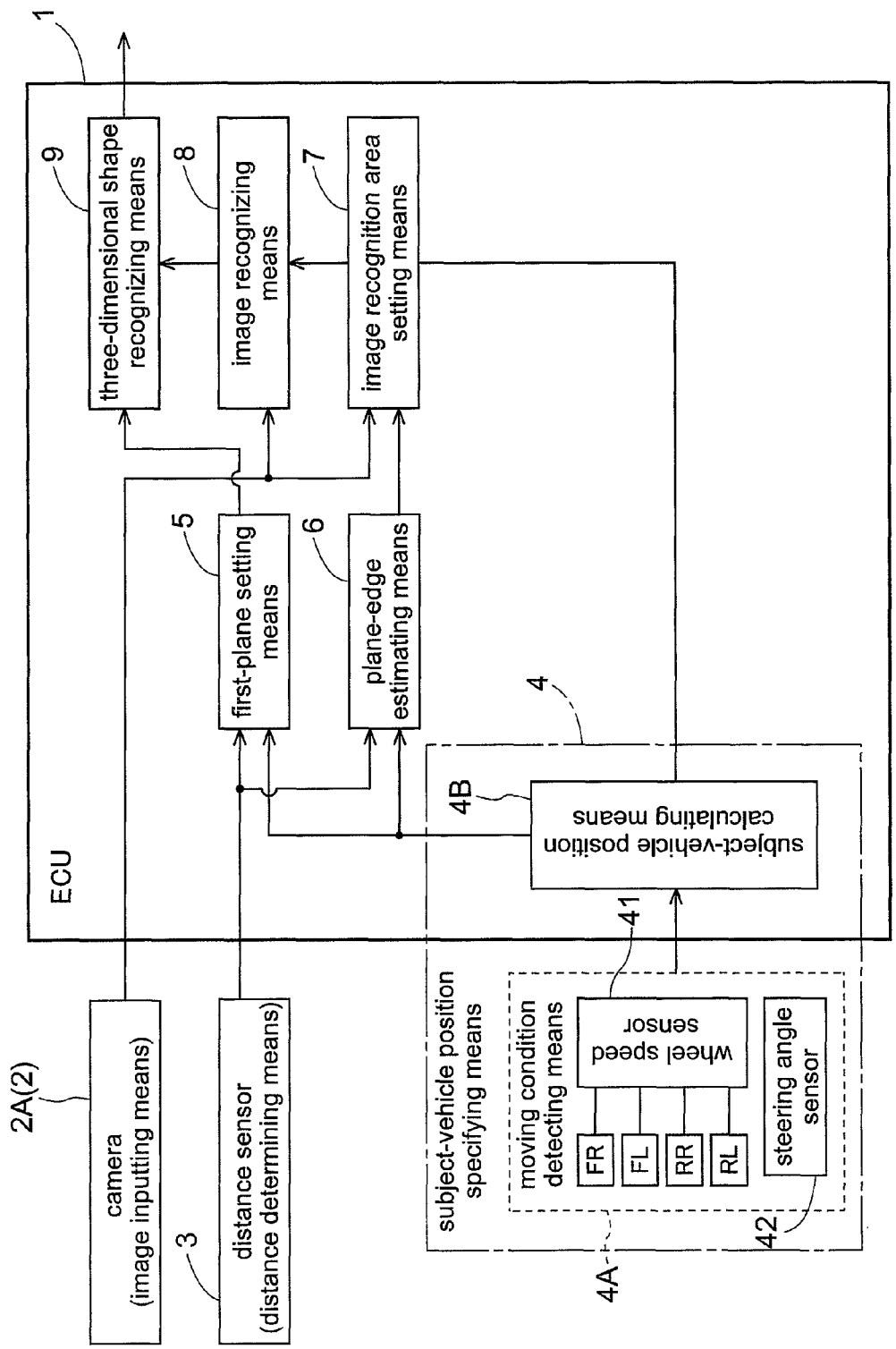
FIG. 1 is a block diagram schematically showing a construction of an obstacle detection apparatus relating to the present invention.
Figure 2:
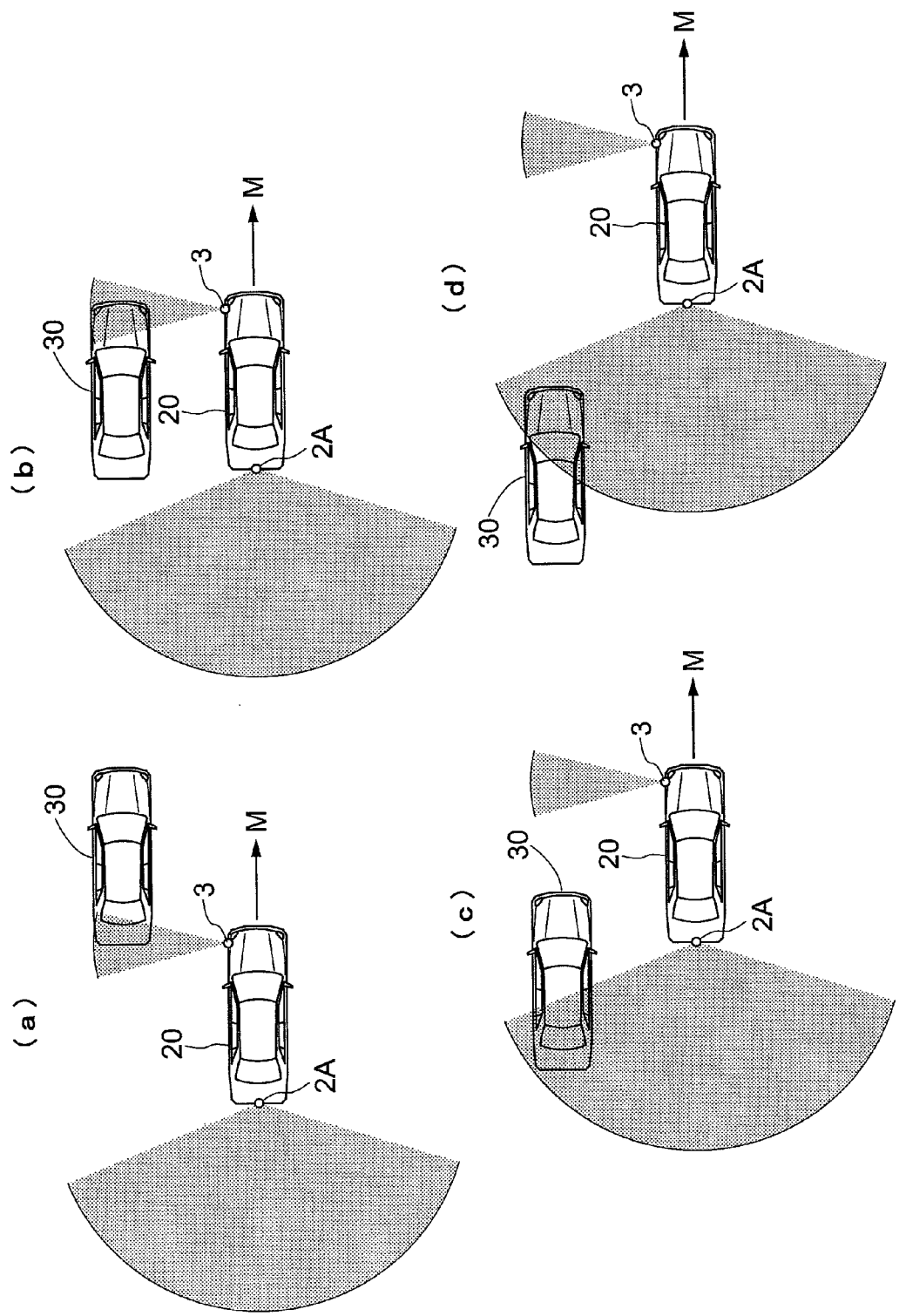
FIG. 2 is an explanatory view illustrating a case where a distance to a parked vehicle and a peripheral image are obtained in accordance with a movement of a vehicle.
Figure 3:
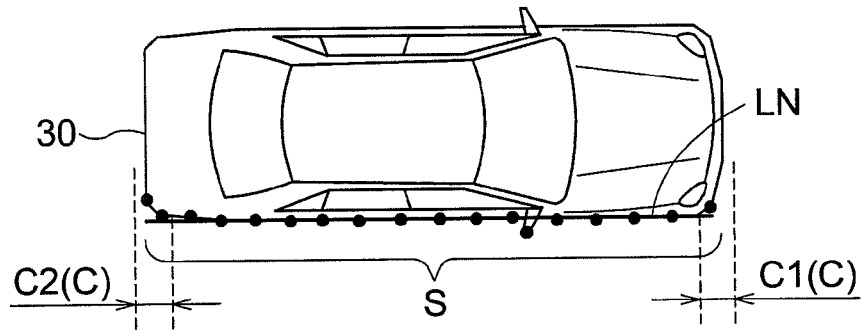
FIG. 3 is an explanatory view illustrating a case in which a first plane is set and a plane edge is estimated.
Figure 4:
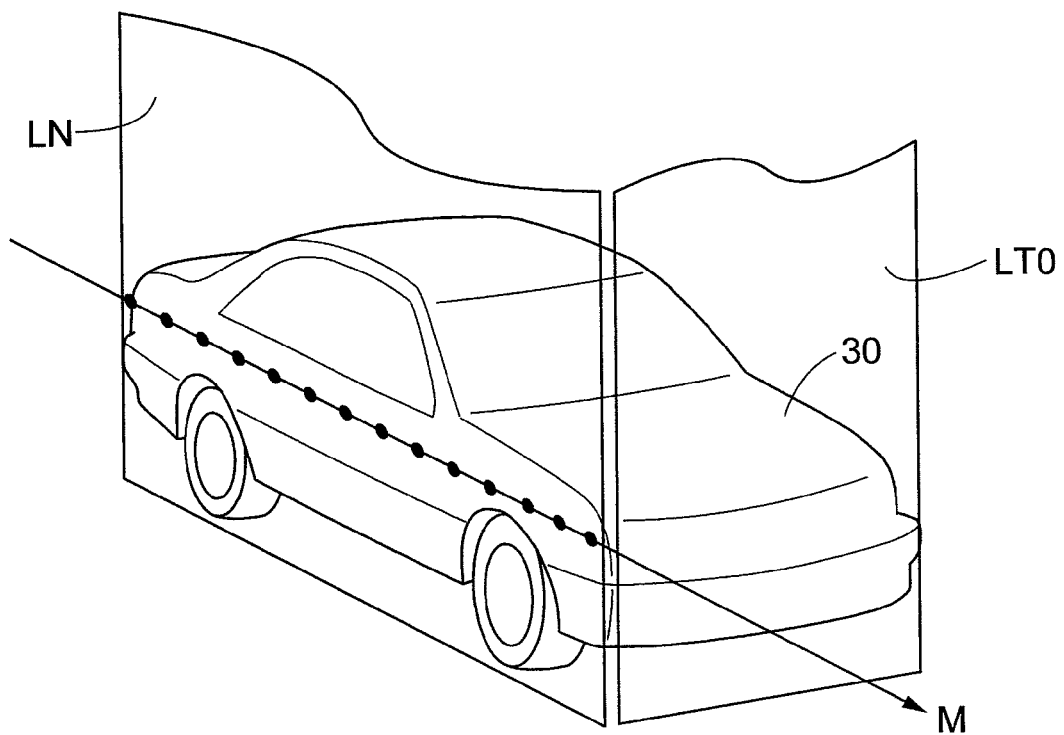
FIG. 4 is a perspective view showing an example of relationship between a parked vehicle and first and second planes.
Figure 5:
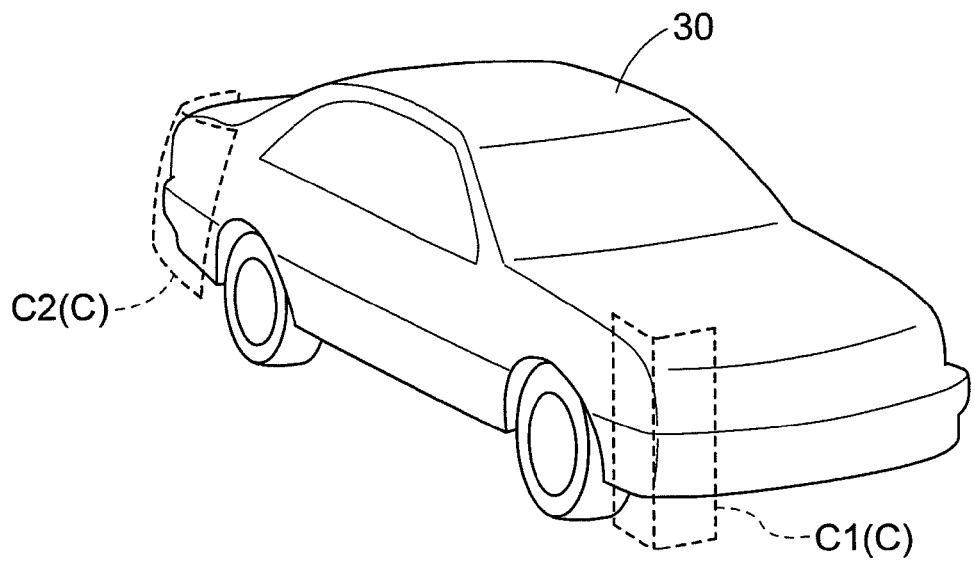
FIG. 5 is a perspective view illustrating an example of an image recognition area at a plane edge.
Figure 6:
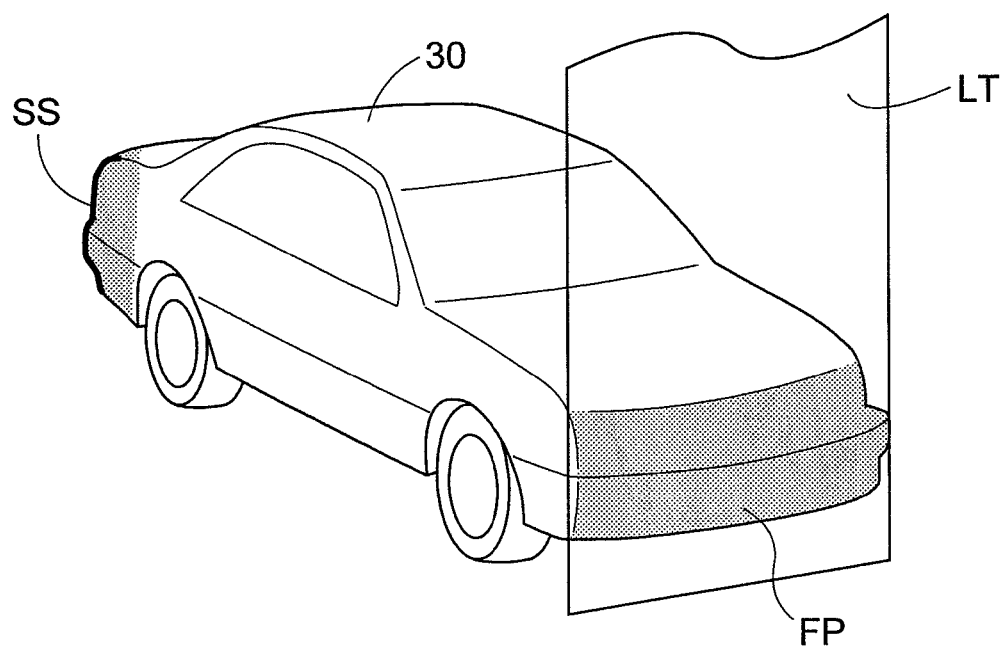
FIG. 6 is a perspective view illustrating examples of a curve shape of a parked vehicle recognized by image recognition technique in an image recognition area, and a second plane to be constructed.
Figure 7:
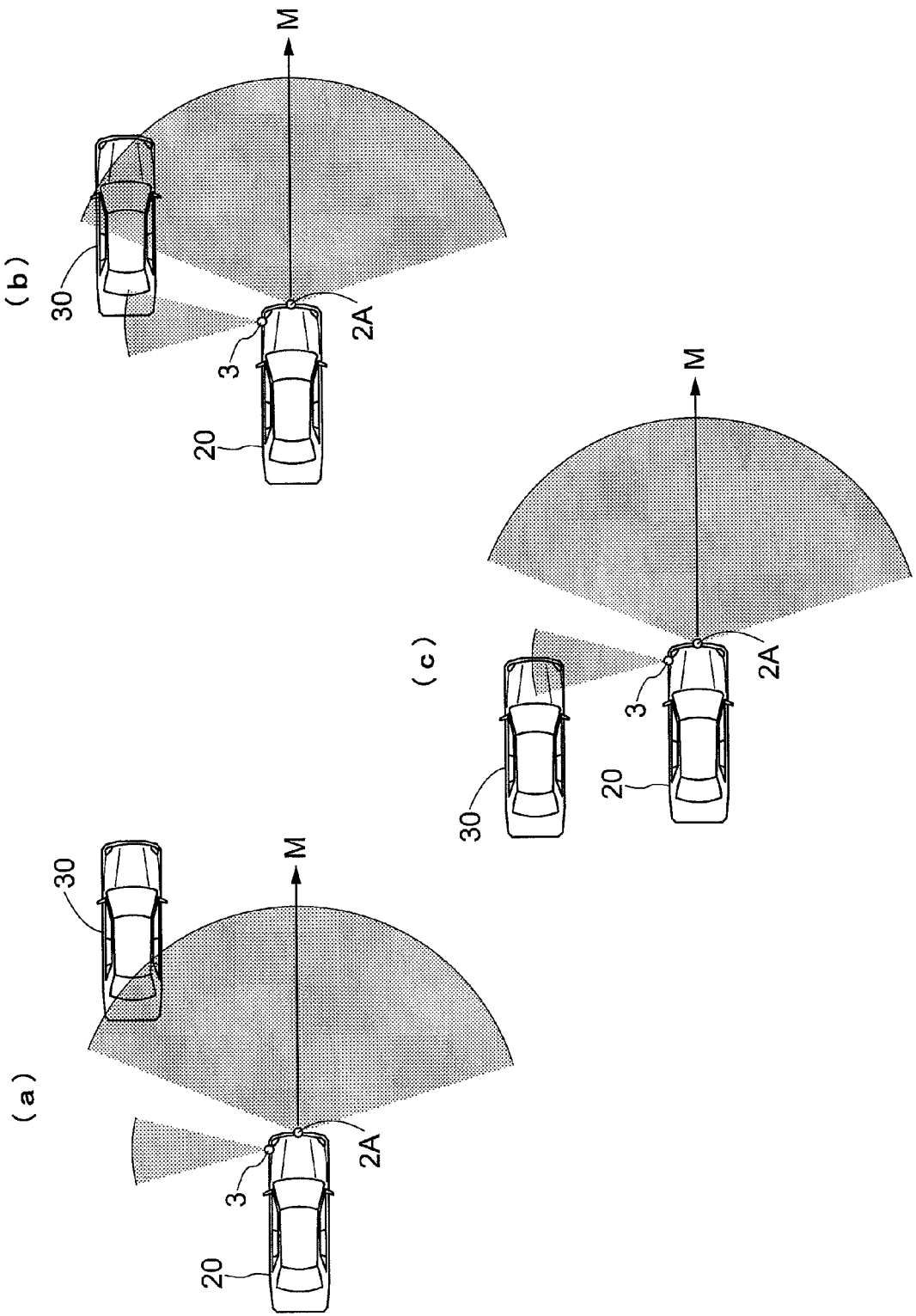
FIG. 7 is an explanatory view of Example 1 where a distance to a parked vehicle and a peripheral image are obtained in accordance with a movement of a vehicle.
Figure 8:
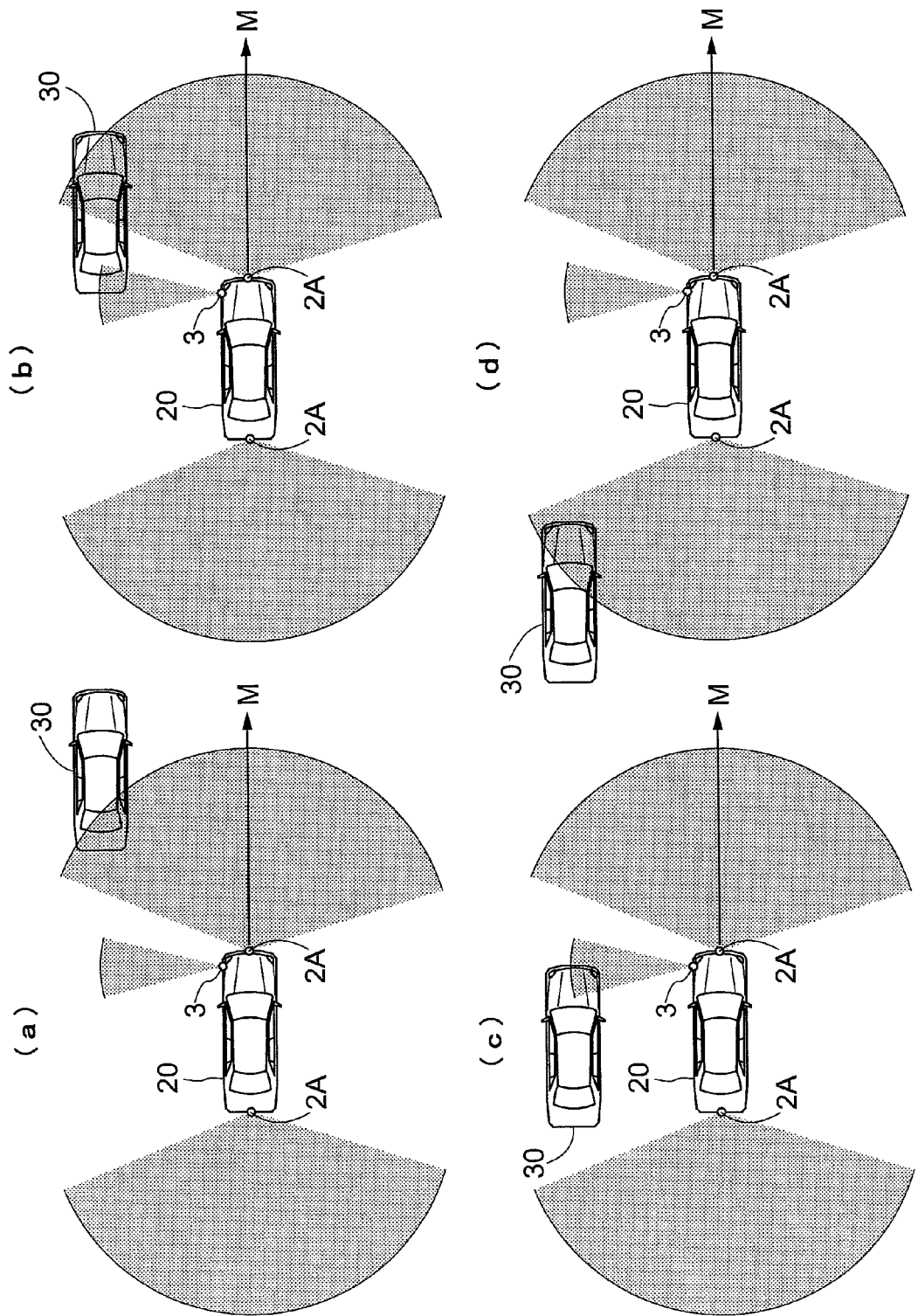
FIG. 8 is an explanatory view of Example 2 where a distance to a parked vehicle and a peripheral image are obtained in accordance with a movement of a vehicle.
Figure 9:
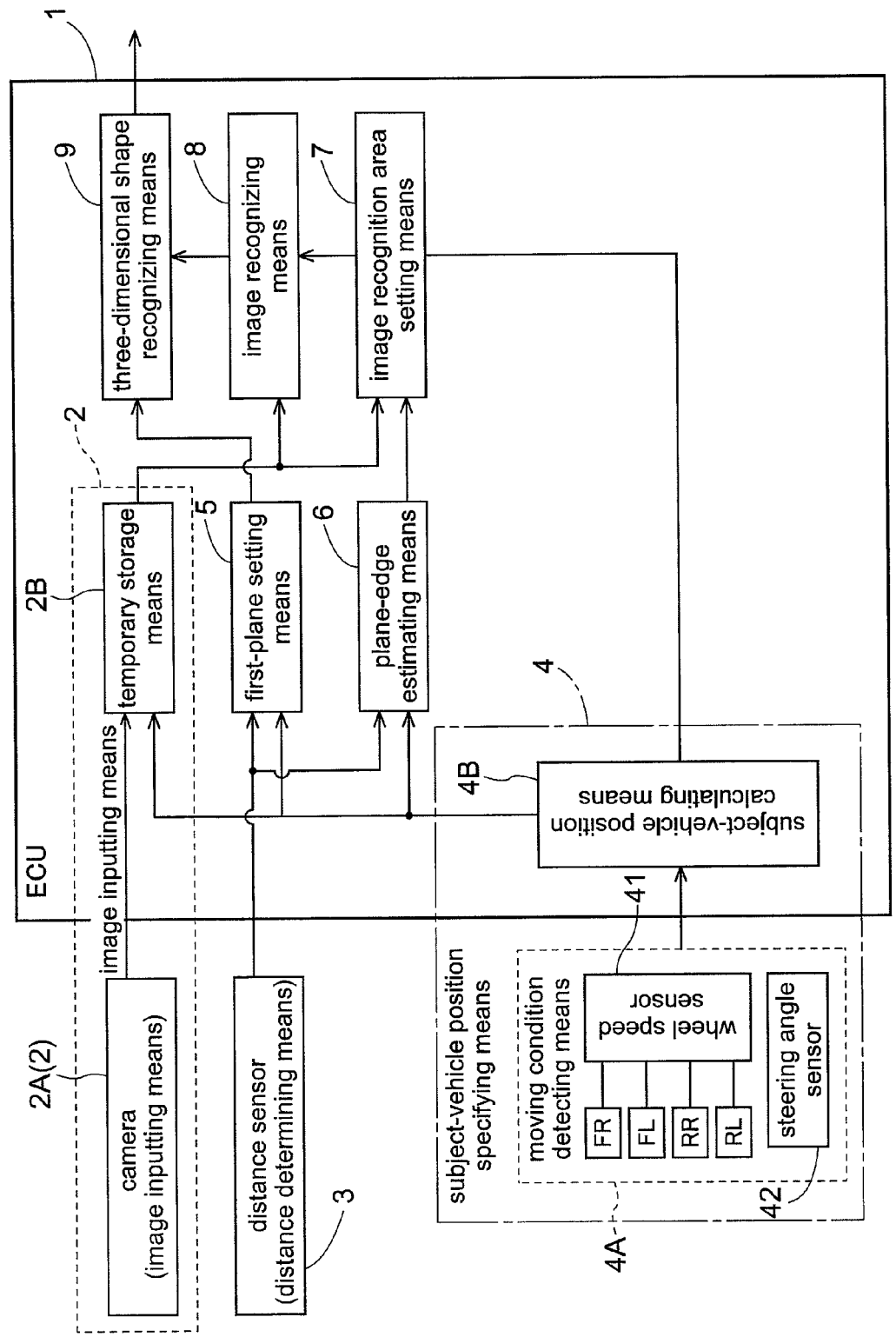
FIG. 9 is a block diagram schematically showing a further construction of the obstacle detection apparatus relating to the present invention.
Figure 10:
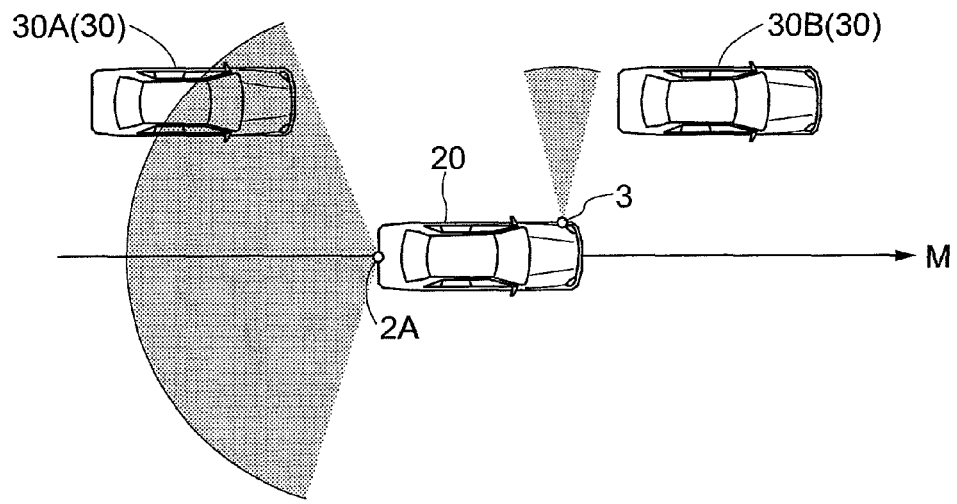
FIG. 10 is an explanatory view illustrating a case in which in the application of the present invention to parallel parking, a distance to a parked vehicle and a peripheral image are obtained in accordance with a movement of a vehicle.
Figure 11:
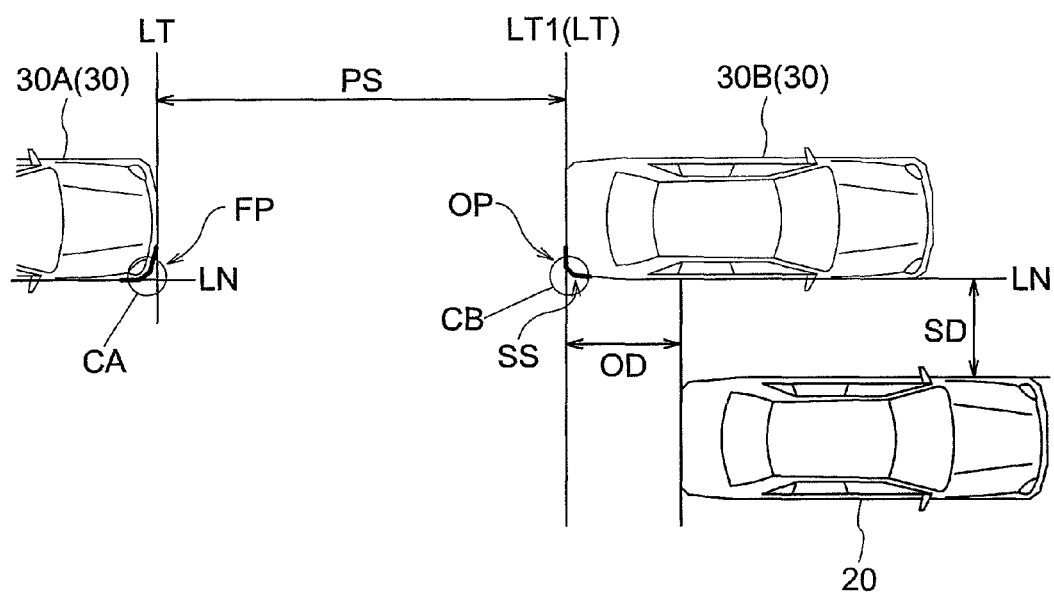
FIG. 11 is an explanatory view showing two-dimensionally correlation of detection result of the obstacle detection apparatus of the present invention when applied to parallel parking.
Figure 12:
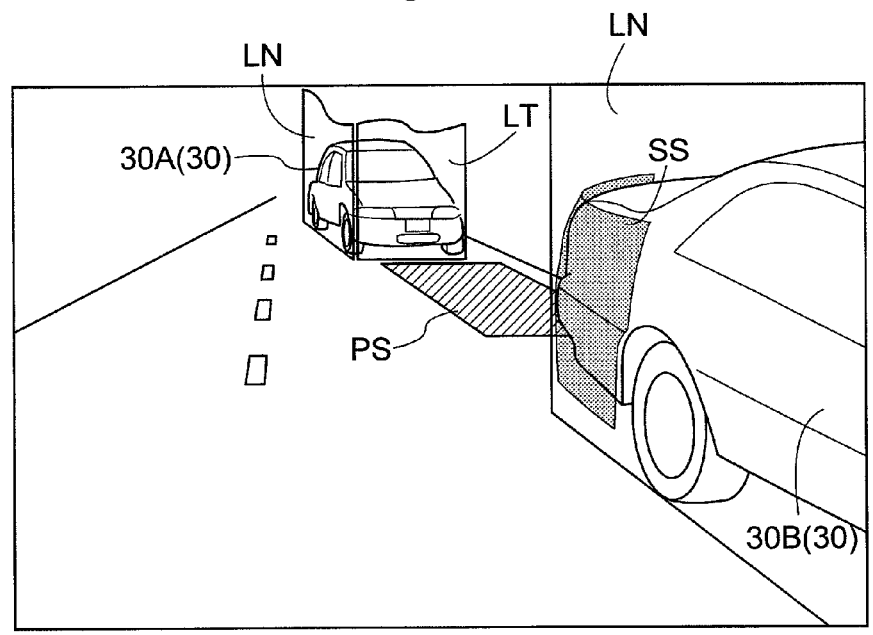
FIG. 12 is a perspective view showing three-dimensionally result of detection of the obstacle detection apparatus in the case of application of the present invention to parallel parking.
Figure 13:
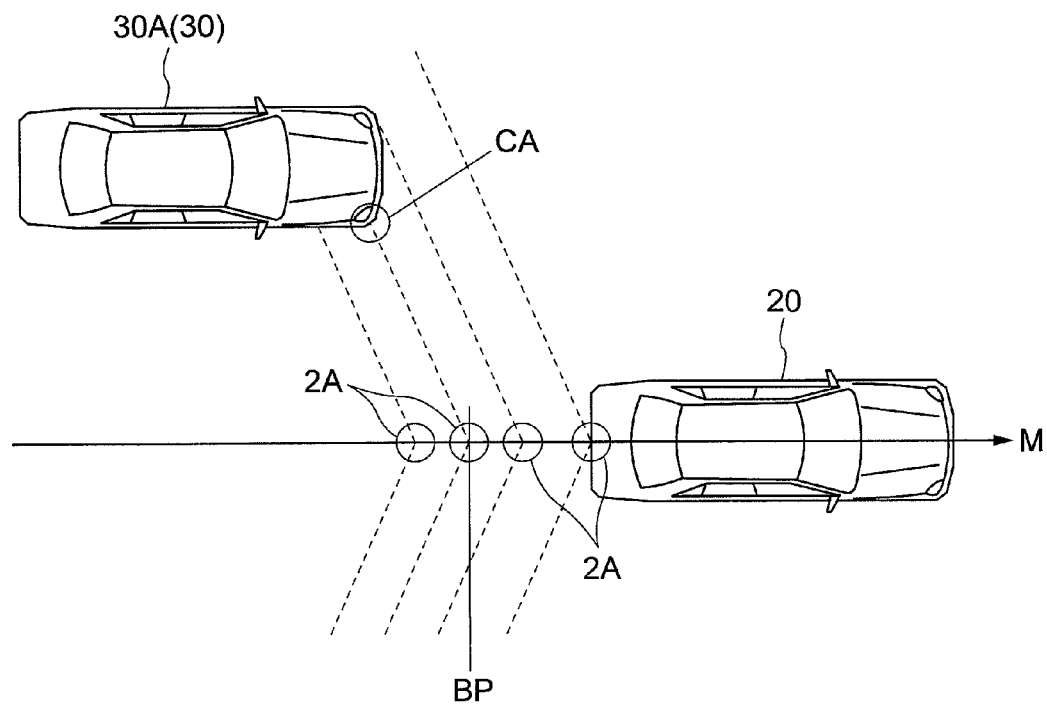
FIG. 13 is an explanatory view illustrating a method for recognizing shape characteristic (front profile) in order to reconstruct a second plane.
Figure 14:
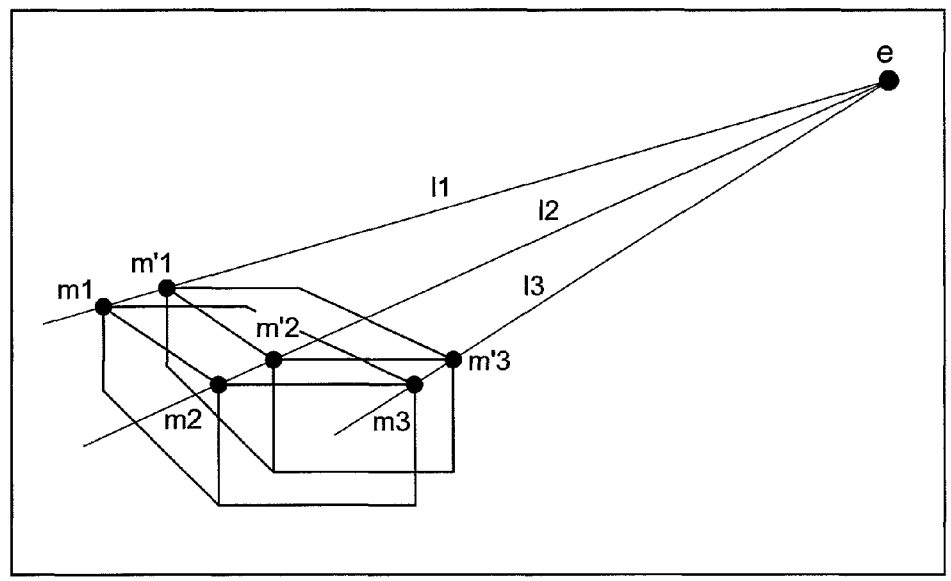
FIG. 14 is an explanatory view illustrating a principle of calculating front profile with using the epipolar geometry.
Figure 15:
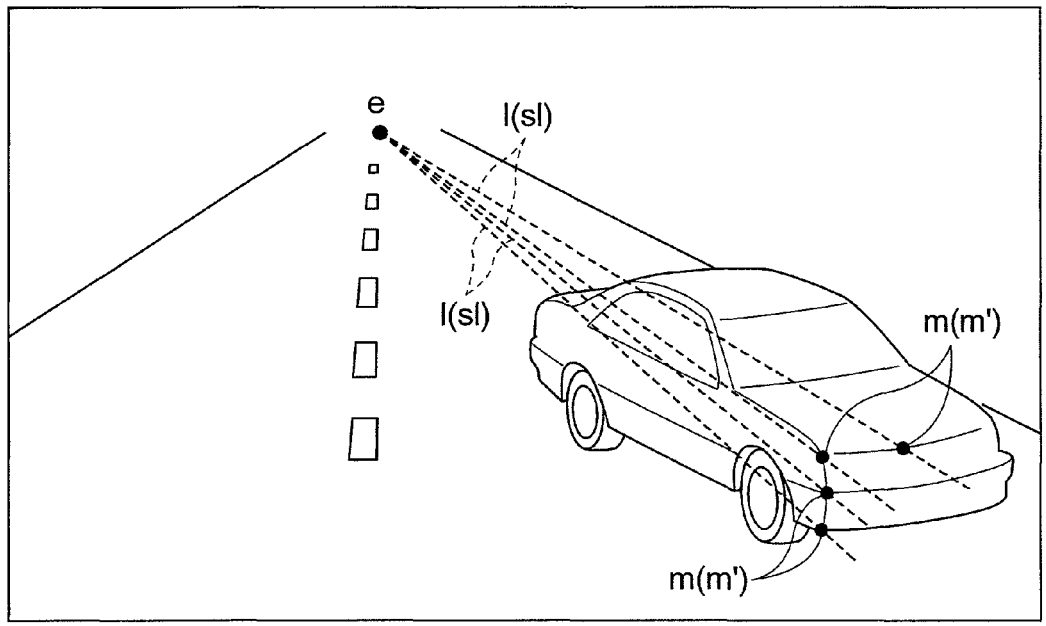
FIG. 15 is an explanatory view illustrating an example of calculating front profile with using epipolar lines as scanning lines.
Figure 16:
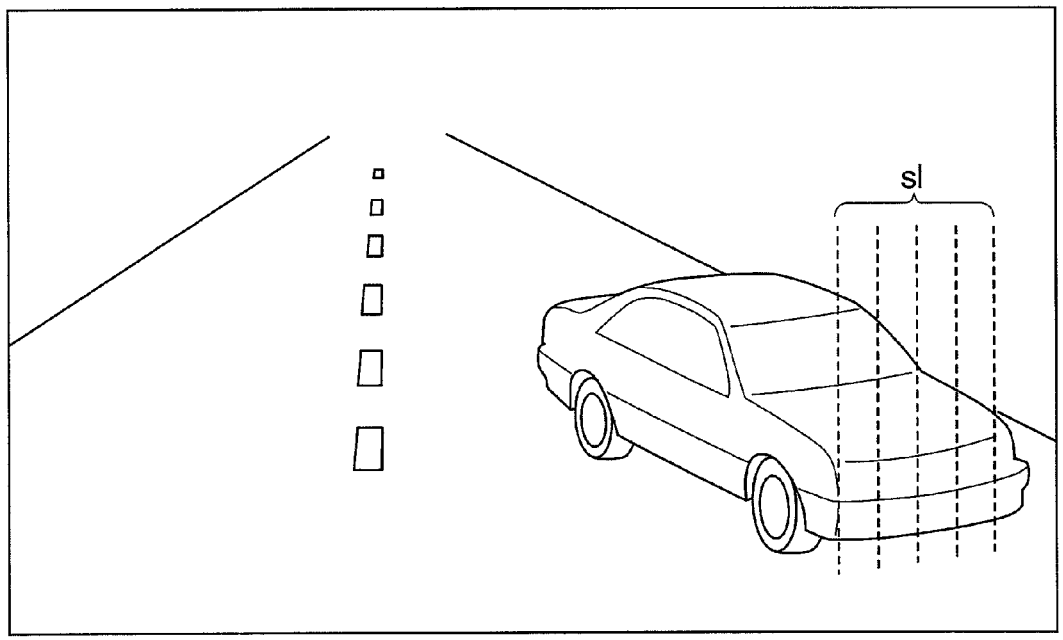
FIG. 16 is an explanatory view illustrating calculation of front profile with using perpendicular scanning lines.
Figure 17:
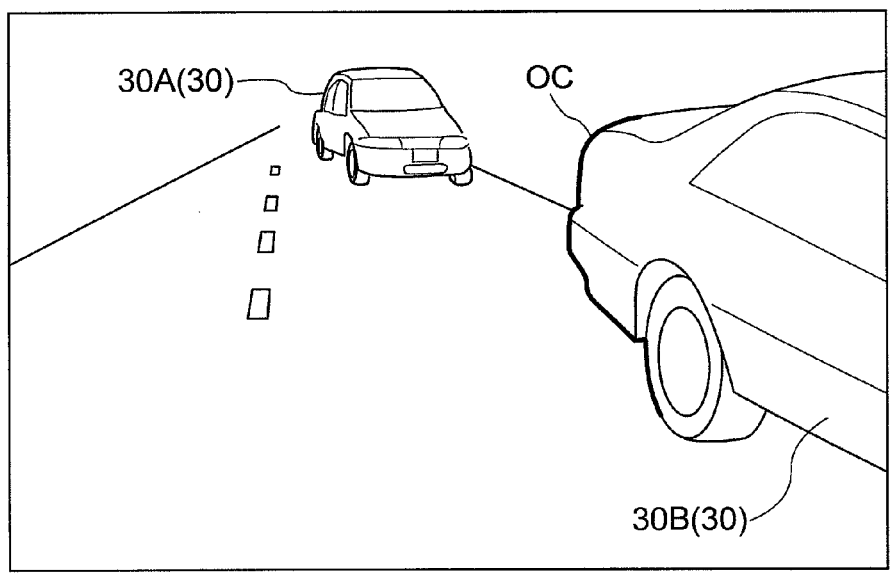
FIG. 17 is an explanatory view illustrating an occlusion contour of a parked vehicle on a peripheral image.
Figure 18:
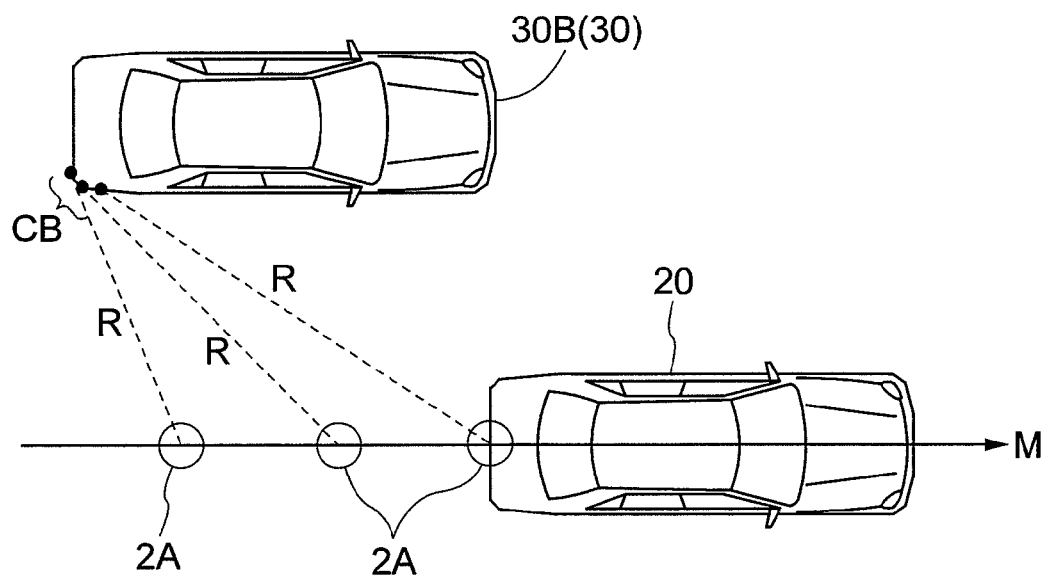
FIG. 18 is an explanatory view illustrating relationship between a moving vehicle and an occlusion contour.
Figure 19:
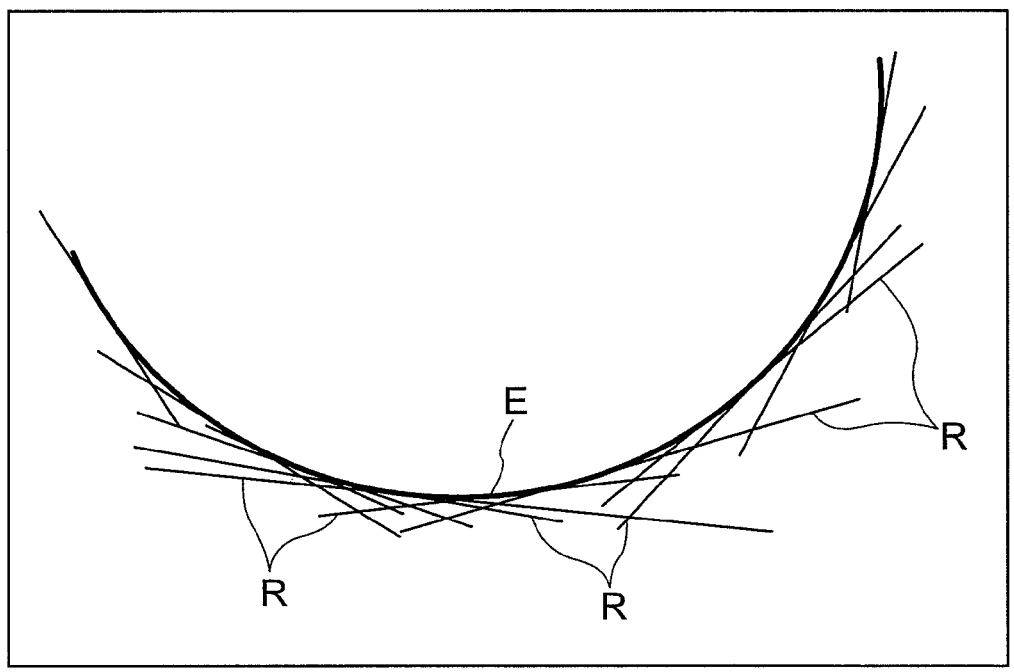
FIG. 19 is an explanatory view showing light rays from a camera to points on occlusion contour and an envelope thereof.
Figure 20:
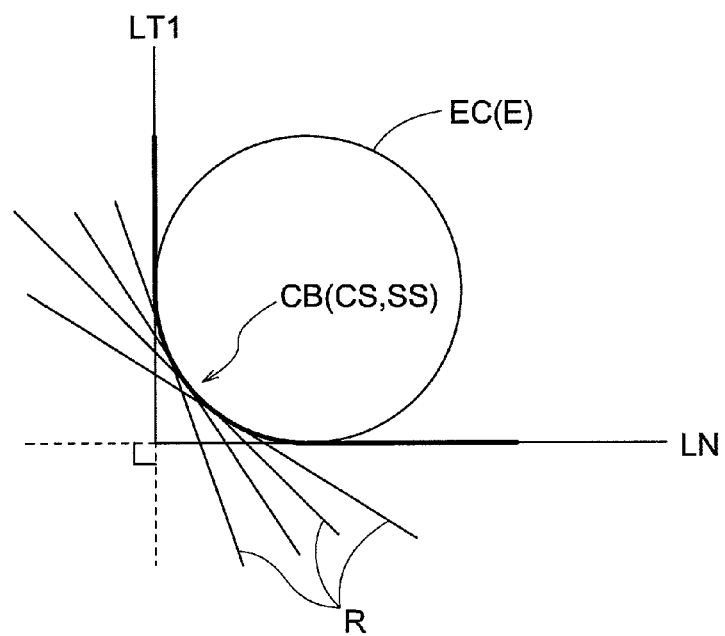
FIG. 20 is an explanatory view of approximation of the envelope shown in FIG. 19 by an osculating circle.
Figure 21:
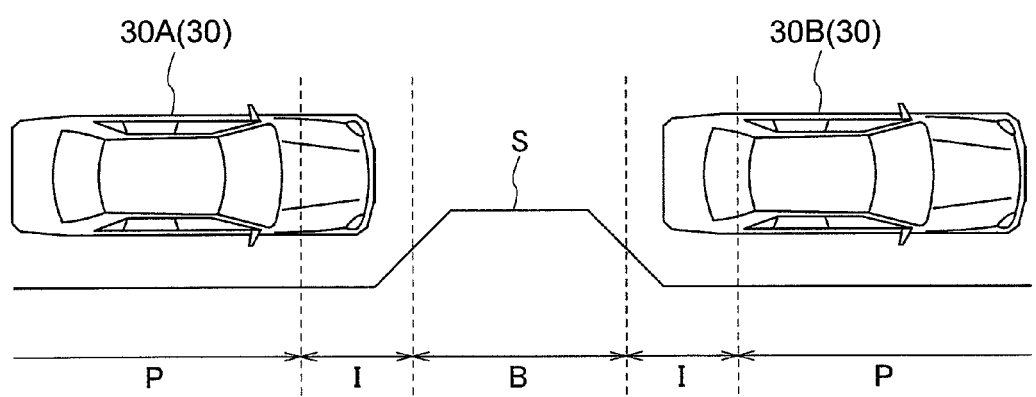
FIG. 21 is an explanatory view illustrating relationship between characteristics of result of determination by distance determining means relative to presence of an obstacle and image processing.

2A: camera, 2B: storage means
3: distance sensor (distance determining means)
4: subject-vehicle position specifying means
5: first plane setting means
6: plane-edge estimating means
7: image recognition area setting means
8: image recognizing means
9: three-dimensional shape recognizing means

The invention claimed is:

1. An obstacle detection apparatus for detecting an obstacle based on an image of periphery of a vehicle and a distance to an obstacle present in the vehicle's periphery, the apparatus comprising:

distance determining means for determining, in association with traveling of the vehicle along a direction, a distance to the obstacle present in a direction perpendicular to the vehicle traveling direction;

image inputting means for obtaining a peripheral image having a view angle including the obstacle, in association with the traveling of the vehicle;

subject-vehicle position specifying means for sequentially specifying a present position of the vehicle which changes in association the traveling of the vehicle;

first-plane setting means for setting, as a first plane and based on said distance and said subject-vehicle position, a face of the obstacle which extends perpendicular to the horizontal plane and extends, at the same time, along the traveling direction of the vehicle;

plane-edge estimating means for estimating a plane edge of said first plane relative to the vehicle moving direction, based on said distance and said position of the vehicle;

image recognition area setting means for setting, as an image recognition area, an area included in the peripheral image and including said plane edge;

image recognizing means for image-recognizing a shape characteristics of the obstacle in the image recognition area from the peripheral image; and three-dimensional shape recognizing means for recognizing the obstacle three-dimensionally, based on said first plane and result of the image recognition made by said image recognizing means.

2. The obstacle detection apparatus according to claim 1, wherein said image recognizing means recognizes a curve shape of the obstacle, by effecting the image recognition of the shape characteristics of the obstacle in the image recognition area, and said three-dimensional shape recognizing means recognizes the obstacle three-dimensionally, based on said first plane and said curve shape.

3. The obstacle detection apparatus according to claim 1, wherein said distance determining means is mounted to a lateral face of the vehicle to be oriented laterally;

said image inputting means is mounted to be oriented toward at least one of the front side and the rear side of the vehicle;

said image inputting means includes temporary storage means for temporarily storing the peripheral image obtained; and said shape recognizing means effects the image recognition of the shape characteristics from the peripheral image stored in said temporary storage means.

4. The obstacle detection apparatus according to claim 1, wherein said distance determining means is mounted ahead of the image inputting means in the vehicle moving direction and mounted to a lateral face of the vehicle to be oriented laterally; whereas said image inputting means is mounted to be oriented to the rear side in the vehicle moving direction.

5. The obstacle detection apparatus according to claim 1, wherein said image recognizing means detects another vehicle parked in the periphery of the subject vehicle, as said obstacle.

6. The obstacle detection apparatus according to claim 5, wherein said image recognizing means recognizes a curve shape of the parked vehicle based on an occlusion contour thereof.

7. The obstacle detection apparatus according to claim 6, wherein said image recognizing means recognizes a corner portion of the parked vehicle.

* * * * *